(12) United States Patent
Panchbudhe et al.

(10) Patent No.: US 9,086,819 B2
(45) Date of Patent: Jul. 21, 2015

(54) SYSTEM AND METHOD FOR COMBINING DEDUPLICATION AND ENCRYPTION OF DATA

(75) Inventors: Ankur Panchbudhe, Pune (IN); Anand A. Kekre, Pune (IN)

(73) Assignee: Anoosmar Technologies Private Limited, Pune (IN)

(*) Notice: Subject to any disclaimer, the term of this patent is extended or adjusted under 35 U.S.C. 154(b) by 38 days.

(21) Appl. No.: 13/557,981

(22) Filed: Jul. 25, 2012

(65) Prior Publication Data

US 2014/0032925 A1    Jan. 30, 2014

(51) Int. Cl.
*G06F 17/30* (2006.01)
*G06F 3/06* (2006.01)
*G06F 21/60* (2013.01)
*H04L 29/06* (2006.01)

(52) U.S. Cl.
CPC .............. *G06F 3/067* (2013.01); *G06F 3/0608* (2013.01); *G06F 3/0641* (2013.01); *G06F 17/30156* (2013.01); *G06F 21/602* (2013.01); *H04L 63/0428* (2013.01); *G06F 3/0623* (2013.01); *G06F 2221/2107* (2013.01)

(58) Field of Classification Search
CPC ....... G06F 3/067; G06F 3/064; G06F 3/0641; G06F 3/0608; G06F 3/062; G06F 3/0623; G06F 21/60; G06F 21/602; G06F 21/78; G06F 2221/2107; G06F 17/3015; G06F 17/30156; G06F 17/30197; H04L 63/0428; H04L 63/062; H04L 63/065; H04L 63/10; H04L 63/104; H04L 63/20; H04L 63/205
USPC ........................................................ 713/189
See application file for complete search history.

(56) References Cited

U.S. PATENT DOCUMENTS

| | | | |
|---|---|---|---|
| 2009/0204649 A1* | 8/2009 | Wong et al. .................... | 707/204 |
| 2010/0161554 A1* | 6/2010 | Datuashvili et al. ........... | 707/610 |
| 2010/0306176 A1* | 12/2010 | Johnson et al. ................ | 707/664 |
| 2010/0332454 A1* | 12/2010 | Prahlad et al. ................. | 707/654 |
| 2011/0016095 A1* | 1/2011 | Anglin et al. .................. | 707/692 |
| 2011/0060887 A1* | 3/2011 | Thatcher et al. ............... | 711/171 |
| 2011/0158147 A1* | 6/2011 | Li et al. ......................... | 370/312 |
| 2012/0089578 A1* | 4/2012 | Lam .............................. | 707/692 |
| 2012/0134494 A1* | 5/2012 | Liu ................................ | 380/44 |
| 2012/0158672 A1* | 6/2012 | Oltean et al. .................. | 707/692 |
| 2012/0179656 A1* | 7/2012 | Bunte et al. ................... | 707/667 |
| 2013/0151484 A1* | 6/2013 | Kruglick ........................ | 707/692 |
| 2013/0290275 A1* | 10/2013 | Stoakes et al. ................ | 707/692 |

\* cited by examiner

*Primary Examiner* — Saleh Najjar
*Assistant Examiner* — Eric W Shepperd
(74) *Attorney, Agent, or Firm* — Rahman LLC

(57) ABSTRACT

The embodiments herein relate to data management and, more particularly, to global deduplication and encryption of data in data management systems. The user equipments (UE) are grouped under certain deduplication groups based on certain parameters such as rate of data exchange, frequency of data exchange, social closeness, work closeness, similarity of data and interests and so on, between those UEs. Further, specific deduplication and encryption parameters such as encryption method, encryption key, signature computation method, block computation method and so on are assigned to each group. Further, deduplication and encryption of data in each group is performed using the deduplication and encryption modes and parameters assigned to each group. The deduplication and encryption of data is performed in at least one of the UEs and/or a server. Further, the parameters used for deduplication and encryption are stored in specific databases and are encrypted for better security.

18 Claims, 7 Drawing Sheets

SYSTEM AND METHOD FOR COMBINING DEDUPLICATION AND ENCRYPTION OF DATA

TECHNICAL FIELD

The embodiments herein relate to data management and, more particularly, to global deduplication and encryption of data in data management systems.

BACKGROUND

When it comes to any data management requirement, whether it is data storage or data transmission, two main concerns are space and security. With more and more data to be handled day by day, it becomes difficult to find out space to save all the data. Further, with new quality standards being introduced frequently, size of data also increases accordingly. For example, in data storage and communication systems such as emails, databases and so on, storage space requirements increase with increase in amount of data to be stored. The data storage systems such as database, mail and so on normally are implemented with limited storage space. With data storage requirements increasing day by day, it becomes difficult to store all data in limited storage space. One way to overcome this issue is by compressing the data using any suitable compression scheme. Another efficient way for achieving data compression is deduplication. A data stream may contain redundant information. Deduplication helps to remove redundant information, thereby achieving data compression.

Another important concern in data management is security. When data is stored in a database or when data is being transmitted over a channel, it is important to maintain data security so that the data is not getting compromised. Data security may be ensured through use of suitable encryption methods.

When data is to be stored in a storage medium, deduplication is performed to achieve compression. Further, security of the data may be ensured by encrypting the data. In the existing systems, the deduplicated data is sent to an encryption module to perform encryption. Further, encrypted data and encryption parameters may be transmitted to the storage module, where it can be stored.

A few existing systems in the field of encryption use convergent encryption. In this method, a hash is calculated for a portion of the input data. Further, rest of the data is encrypted using the calculated hash. Disadvantage of this method is that common data may be identified even without decrypting it.

Few other existing systems uses key based encryption mode. In this mechanism, the key after encrypting the data is shared across other devices in the system. Disadvantage of this mechanism is that if key is leaked, then the data may get compromised.

BRIEF DESCRIPTION OF THE FIGURES

The embodiments herein will be better understood from the following detailed description with reference to the drawings, in which.

DETAILED DESCRIPTION OF EMBODIMENTS

Figure 1A:
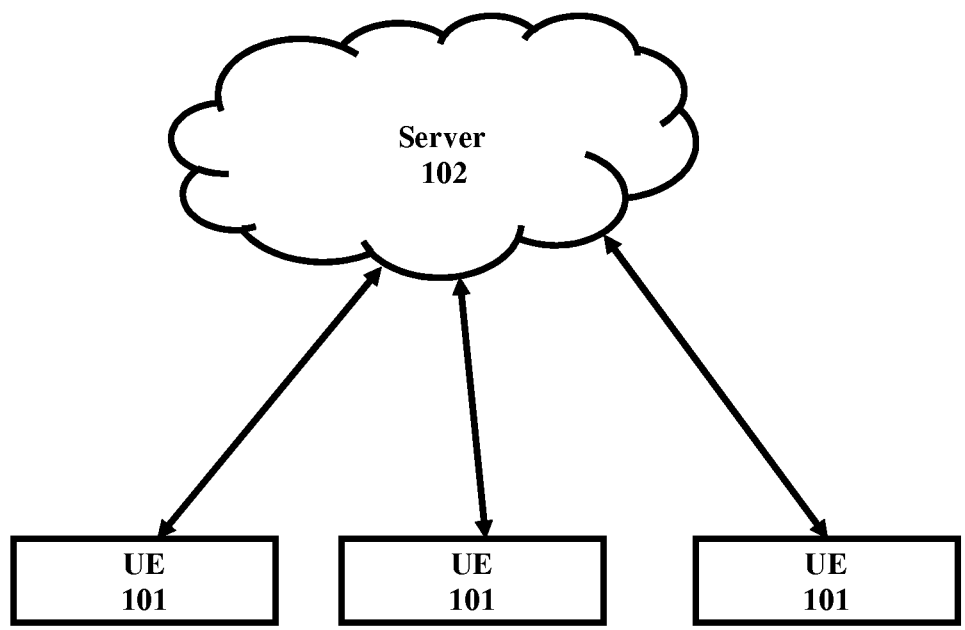
FIGS. 1A and 1B illustrates block diagrams that show client-server and peer-peer implementation of systems for global deduplication, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a process of implementing deduplication and encryption on data by creating deduplication groups of user equipments. Referring now to the drawings, and more particularly to FIGS. 1 through 5, where similar reference characters denote corresponding features consistently throughout the figures, there are shown embodiments.

Figure 1B:
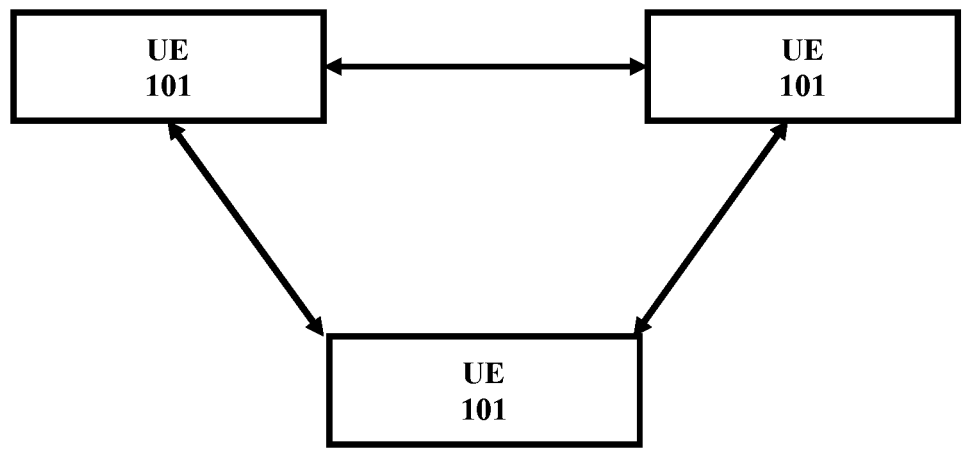

FIGS. 1A and 1B illustrate block diagrams that show client-server and peer-peer implementation of systems respectively, as disclosed in the embodiments herein. The client-server implementation comprises a plurality of user equipments (UE) 101 and a server 102. In an embodiment, the UE 101 may be any device such as computer, mobile phone, Personal Digital Assistant (PDA) and so on. In another embodiment, a part of a machine such as a software, firmware, and hardware and so on may function as the UE 101.

Further, the server 102 may be a logical server and all the associated UE 101 may communicate with the server 102 for data storage or any such applications. In various embodiments, the server 102 may be present in a cloud or in a local network. In the client-server model, the at least one UE 101 and the server 102 may together form a communication and/or storage medium. In order to act as a storage medium, the server 102 may possess a storage unit. In various embodiments, the storage unit may be internal or external to the server 102. Examples of storage units are, but not limited to hard disks, Random Access Memory (RAM), Read Only Memory (ROM), optical storage, tapes, network storage, solid state storage (SSD), cloud storage, Storage Area Network (SAN), Network Attached Storage (NAS) and so on. Further, in client-server architecture, the UEs as well as the server may be assigned a unique Id for other systems to recognize.

In another embodiment, plurality of UEs 101 may form a peer-peer connection. In this architecture, the server 102 may not be present and the UEs 101 may form a communication or storage system. Further, in the peer-peer group of UEs 101, at least one UE 101 may possess a storage unit to act as a storage medium in that particular group. Further, each UE 101 and/or associated applications present in a peer-peer group may be assigned a unique Id that may be used to identify and/or authenticate the UE 101 or that application.

In a preferred embodiment, the UEs 101 and/or the server 102 present in a particular group may act as a deduplication group. Further, specific deduplication and encryption methods and parameters may be assigned to each group. In a preferred embodiment, each deduplication group may be assigned unique deduplication and encryption methods and settings so as to ensure data security. Further, in the deduplication groups, deduplication and encryption of data may be performed at a source.

Figure 2:
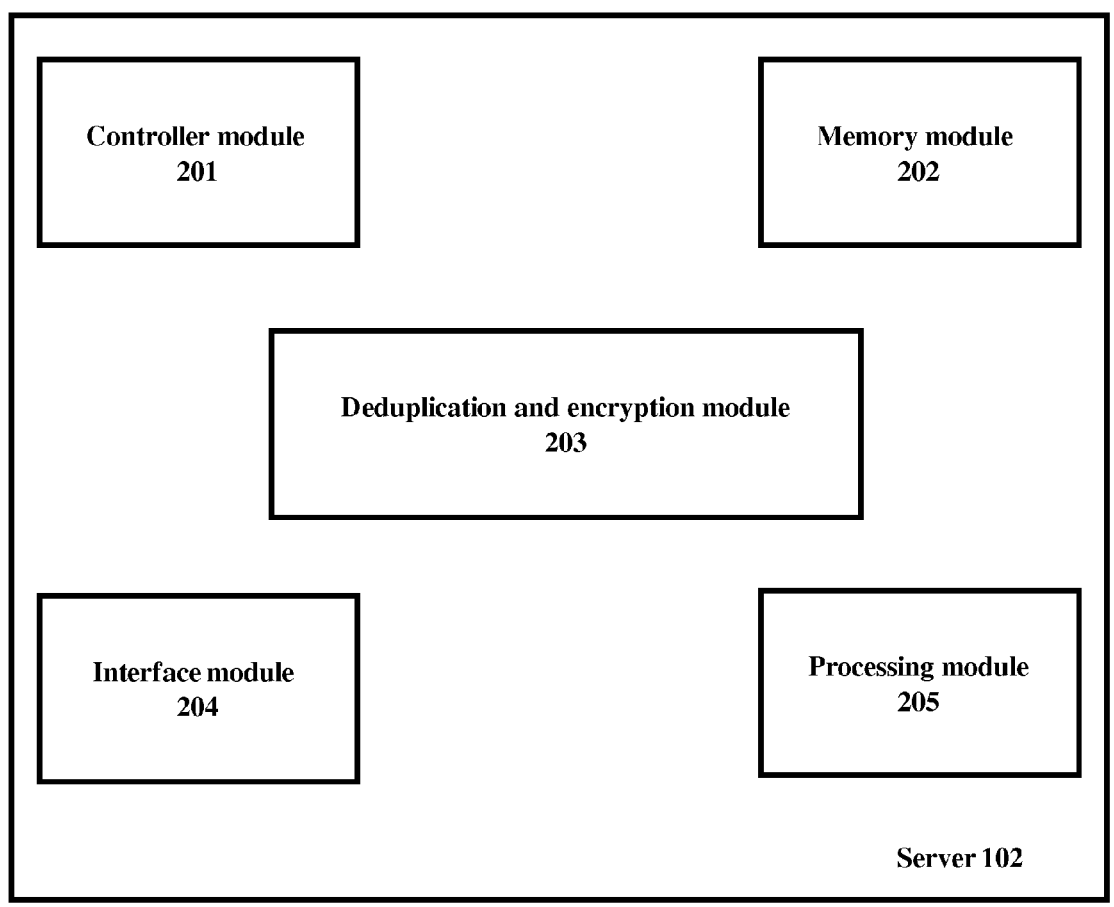
FIG. 2 illustrates a block diagram which shows various components of server, as disclosed in the embodiment herein.

FIG. 2 illustrates a block diagram which shows various components of server, as disclosed in the embodiment herein. The server comprises a controller module 201, a memory module 202, a deduplication and encryption module 203, an interface module 205 and a processing module 206.

The controller module 201 may control and coordinate all functions of the server 102. For example, the controller module 201 may monitor flow of data from and to the server 102 and may provide instructions to other modules accordingly. In an embodiment, the controller module 201 may be able to perform monitoring and grouping processes. In the monitoring process, the controller module 201 may monitor various network parameters such as rate of data traffic, frequency of data traffic and so on between at least two UEs 101. Further, in the grouping process, the controller module 201 may select and group certain UEs 101 based on the monitored parameters to form at least one deduplication group.

Further, the memory module 202 may act as a storage medium to store data received from at least one UE 101. In various embodiments, the memory module 202 may be internal or external to the server 102. The memory module 202 may be any or a combination of hard disks, Random Access Memory (RAM), read Only Memory (ROM), optical storage, tapes, network storage, solid state storage, cloud storage, Storage Area Network (SAN), Network Attached Storage (NAS) and so on. Further, in addition to the information received from plurality of UEs 101, the memory module 202 may also store information such as Deduplication and encryption settings assigned to that particular group, unique Id of each associated UE 101 and so on.

In an embodiment, the server 102 may perform deduplication and encryption of data received from at least one of the plurality of UEs 101, using the deduplication and encryption module 203. In a preferred embodiment, the deduplication and encryption module 203 may perform global deduplication of the data. Further, in the global deduplication mode, each UE 101 is listed under certain deduplication group, based on certain parameters. For example, two UEs 101 that are a part of a single communication system and which frequently involve in data exchange may be listed under a particular deduplication group such that chances of deduplication is better between the two UEs 101. Further, deduplication and encryption modes and parameters are assigned to each group. In a preferred embodiment, the deduplication and encryption modes and parameters assigned to each group in a network may be unique.

Further, the interface module 204 may comprise components such as ports so as to establish connectivity with other devices in the group. For example, a plurality of UEs 101, memory modules 202 and so on can establish connection with the server 102 through the interface module 204.

Further, the processing module 205 may be used to process any instruction and/or information received from at least one of the associated UE 101. Further, based on the instruction/information received, the processing module 205 may communicate with associated system components to take any further action. For example, when the processing module 205 receives instruction to search for a specific data signature, it can instruct the deduplication and encryption module 203 to perform the same.

Figure 3:
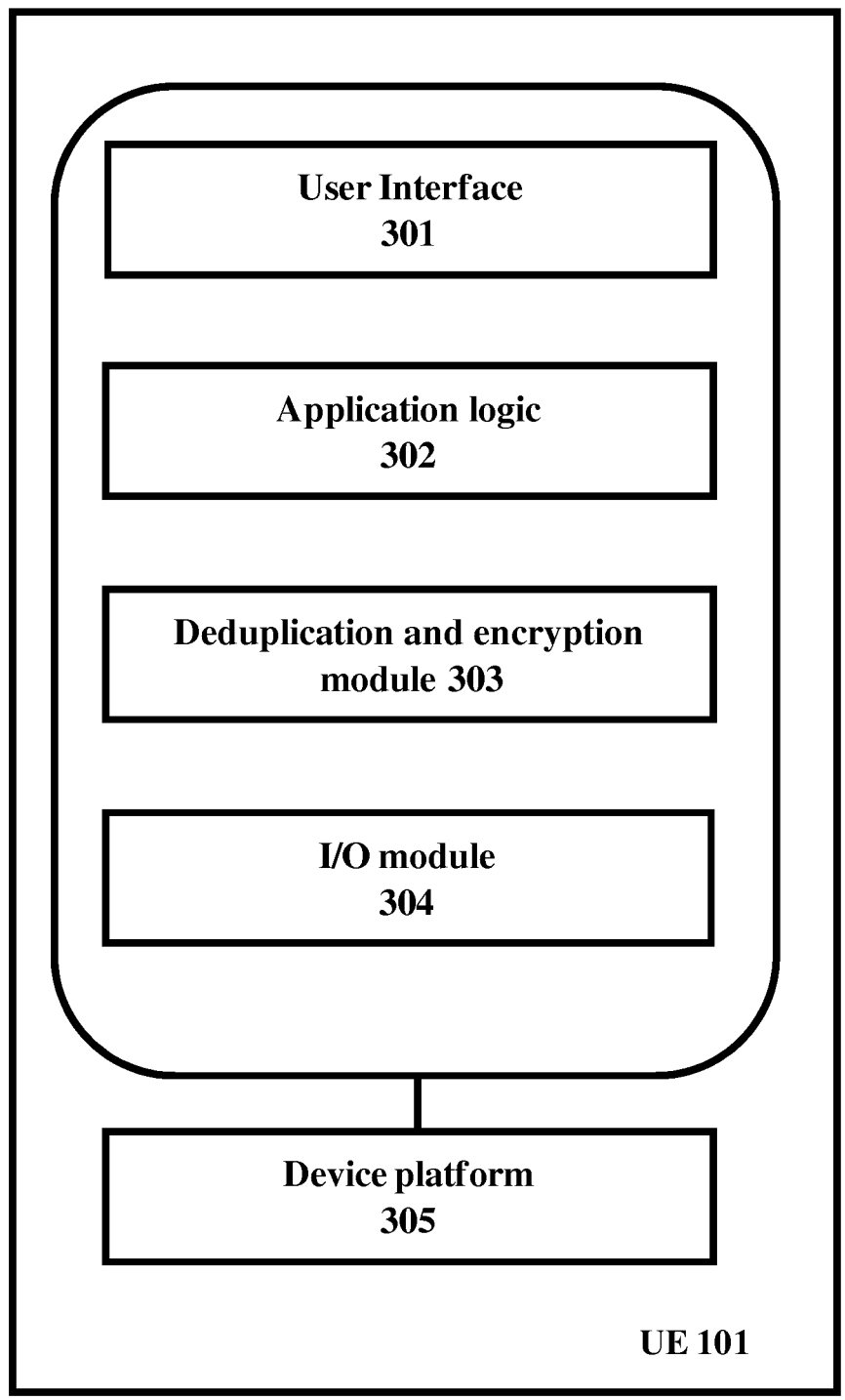
FIG. 3 illustrates a block diagram which shows various components of User Equipment, as disclosed in the embodiment herein.

FIG. 3 illustrates a block diagram which shows various components of the user equipment, as disclosed in the embodiments herein. The user equipment (UE) 101 comprises a user interface (UI) 301, an application logic 302, a deduplication and encryption module 303, an Input/Output (I/O) module 304 and a device platform 305. The UI 301 may help the users to interact with the UE 101. Further, the UI 301 may present information to the user in suitable form such as images, audio, video and so on.

Further, the application logic 302 may act as an interface between user commands and corresponding UE applications. The user may use different UI icons to communicate with different applications present in the UE 101. The application logic 302 may differentiate between various commands and may invoke corresponding service. In a preferred embodiment, the application logic 302 may perform monitoring and grouping processes. In the monitoring process, the application logic 302 may monitor various network parameters such as rate of data traffic, frequency of data traffic and so on between at least two UEs 101. Further, in the grouping process, the application logic 302 may select and group certain UEs 101 based on the monitored parameters to form at least one deduplication group.

Further, the deduplication and encryption module 303 may perform deduplication and encryption of data that is to be stored or transmitted. In a preferred embodiment, the deduplication and encryption module 303 may use a global deduplication mechanism to deduplicate the data. In the global deduplication mechanism, each UE 101 is listed under certain deduplication group. In various embodiments, the deduplication group may comprise one or more UE 101. Further, deduplication and encryption modes and parameters are assigned to each group. In a preferred embodiment, the deduplication and encryption modes and parameters assigned to each group in a network may be unique.

Further, the I/O module 304 may be used to establish connection with other devices for data transfer and storage purposes. In various embodiments, the I/O module 304 may help to establish wired and/or wireless connection with other UEs 101 and server 102. For example, the UE 101 may have a wireless adaptor that facilitates wireless connectivity with other UEs 101. Further, all functionalities of the UE 101 may be built upon a device platform 305 such as an operating system present in the UE 101.

Figure 4:
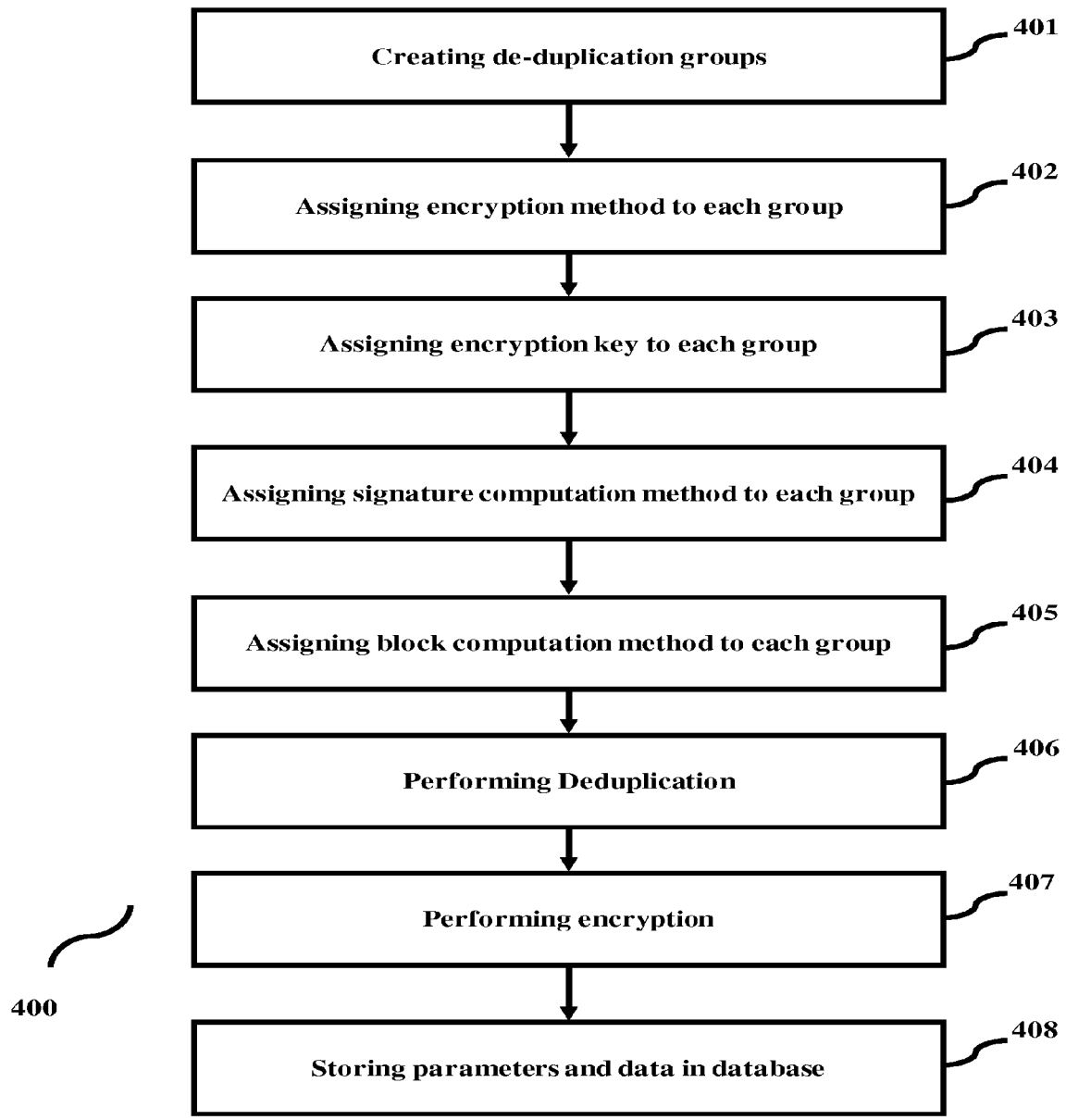
FIG. 4 is a flow diagram which shows various steps involved in the process of performing deduplication and encryption, as disclosed in the embodiments herein.

FIG. 4 is a flow diagram which shows various steps involved in the process of performing deduplication and encryption, as disclosed in the embodiments herein. Initially, the system creates (401) deduplication groups. A deduplication group may be formed by grouping at least one selected UE 101 such that chances of deduplication may be better between the group members. Plurality of UEs 101 that are listed under a particular group may be selected based on certain parameters such as rate of data exchange, frequency of data exchange, social closeness, work closeness, similarity of data and interests and so on, between those UEs 101. For example, users who are in same team in an organization may have high probability of having data exchange between them, and hence, may be listed under same group.

In an embodiment, the division of UEs 101 to groups may be done in static mode. In the static mode, the UEs 101 may be grouped before data start entering the system. In the static mode, the grouping of UEs 101 may be performed by an authorized person such as an administrator and/or user using the UE 101 or the server 102. For example, in client-server architecture, the grouping of UEs 101 may be performed using the server 102 or at least one UE 101. In a peer-peer architecture, the grouping of UEs 101 may be performed using at least one UE 101.

In another embodiment, the division of UEs 101 to groups may be done in dynamic mode. In the dynamic mode, the system may monitor data exchange between a plurality of UEs 101 and may group the UEs 101 based on the data exchange rate, frequency and/or any such parameters. For example, in the client-server architecture, the monitoring and grouping processes may be performed by the controller module 201 and/or the application logic 302. In the peer-peer architecture, the application logic 302 may perform monitoring and grouping processes.

Further, each of the deduplication groups is assigned (402) specific encryption method. In a preferred embodiment, each group may be assigned an encryption method different from other groups present in the same network, so as to ensure better data security. In another embodiment, various groups may be assigned same encryption method based on requirement and for simplicity of implementation. The encryption method used may be a symmetric/private key encryption or a public key encryption. In the private key encryption, same key is used for encryption and decryption of the data. The public key encryption method requires a public key and corresponding private key. At transmitting end, the data is encrypted using the public key. Further, at receiving end the encrypted data is decrypted using the private key which is known only to the person who is receiving the data. For example, the encryption method used may be any of Advanced Encryption Standard (AES), Data Encryption Standard (DES), Blowfish, Rivest-Shamir-Adleman (RSA) algorithm, ElGamal, Digital Signature Algorithm (DSA) and so on.

Further, each of the deduplication groups is assigned (403) specific encryption key. In a preferred embodiment, different deduplication groups may be assigned different encryption keys for better security. The encryption key may be considered as a piece of information that determines functional output of an encryption or decryption process.

The key used may be of any length. If long key is used for encryption, it may ensure better security. Further, a single key may be built using multiple sub-keys such as tokens used in Security Assertion Markup Language (SAML), Open Authorization (OAuth) and so on. A group can use information contained in its key to encrypt data. Further, same information may be used while decoding data to original state.

Further, a signature computation method is assigned (404) to each group. The signature computation method may be used in deduplication to compute unique signatures of blocks of data. The signature may be used to verify authenticity of the data. For example, when hash functions are used in creating digital signatures, it outputs fixed size bit string corresponding to arbitrary data input. Further, authenticity of the hashed function only may be verified to verify authenticity of the data. Further, by checking signature of a data block, the system may be able to identify if any change has been made to the data.

Various signature computation methods that may be used to create strong signature may be SHA-256, RIPEMD-160, SHA-512 and so on. In an embodiment, each group may be assigned different signature computation methods for improved security. In another embodiment, same signature computation method may be assigned to different groups for simplicity of implementation.

Further, each deduplication group is assigned (405) suitable block computation method. The block computation may be used if deduplication is to be performed on variable-sized blocks of data. A suitable hashing method may be used to perform block computation. For example, a Rolling checksum method may be used in which input data is hashed in a window that moves through the input. So as to ensure security, pattern used to determine block boundaries in the hashing method may be kept different for different groups.

Further, minimum and maximum block size values may also be kept different for different groups. For each group, the minimum and maximum block size values may be determined based on type of data being handled by UEs 101 present in the group. In another embodiment, the block computation method and associated parameter values used may be same for all groups.

Further, using the assigned deduplication method and associated parameters, deduplication is performed (406) on the data. In various embodiments, deduplication of data may be performed at data level, fixed sized block level and/or variable sized block level. In data level deduplication, the system may treat the whole data as a single block. If deduplication is performed in fixed sized block level, system may divide data to fixed size blocks. If deduplication is performed in variable sized block level, system may divide data to variable size blocks using the block computation method assigned to the group.

Further, for each of the blocks, the system calculates signature using the signature computation method assigned for that particular group. The system may use the calculated signature to check and determine whether the block is already present in the storage or communication medium associated with the system. In an embodiment, in order to check, the system may compare the signature of the block with a database (database of signatures), which comprises signature information of already stored and/or communicated data blocks. In various embodiments, the database of signatures may be maintained in the server 102 or in a cache associated with the UE 101. Further, frequently used signatures may be stored in a separate location in the server 102 and/or UE 101 for quick look up, speeding up the process of checking.

Further, if the block of data has not been stored or communicated, the system may further process the data and may add or communicate the block. If the data has already been stored or communicated, the system adds only a reference to the already stored or communicated block in the database of signatures. For example, in the client-server architecture, the client/UE can communicate with the server 102 to check if the block of data has already been stored or communicated. Similarly, in the peer-peer architecture, one UE 101 can communicate with other UEs 101 in the group to check if the block of data has already been stored or communicated.

Further, the system performs (407) encryption of the deduplicated data blocks. While encrypting block of data, each block is encrypted separately using encryption method assigned to that particular group. In an embodiment, the encryption used may be a function of encryption key assigned to the group, signature of the block and the server key and logic key/software key. A suitable combination of these parameters may be used to form required encryption method. In another embodiment multiple encryptions may be performed on a single block of data using the encryption key assigned to the group, signature of the block and the server key and logic key in any desired order. For example, first the block could be encrypted using own signature, and then using the group key, then server key and then the logic key. In another embodiment, before storing the data, additional security may be provided by applying an additional encryption at the server 102 or peer, using a key that is known only to that server 102 or peer/UE 101.

Further, various parameters associated with the encryption process such as signatures, group keys, server keys, logic keys may be stored (408) in separate databases. Further, the information kept in separate databases may be secured using at least one of encryption, authentication, isolation, obfuscation and/or a firewall.

The various actions in method 400 may be performed in the order presented, in a different order or simultaneously. Further, in some embodiments, some actions listed in FIG. 4 may be omitted.

Figure 5A:
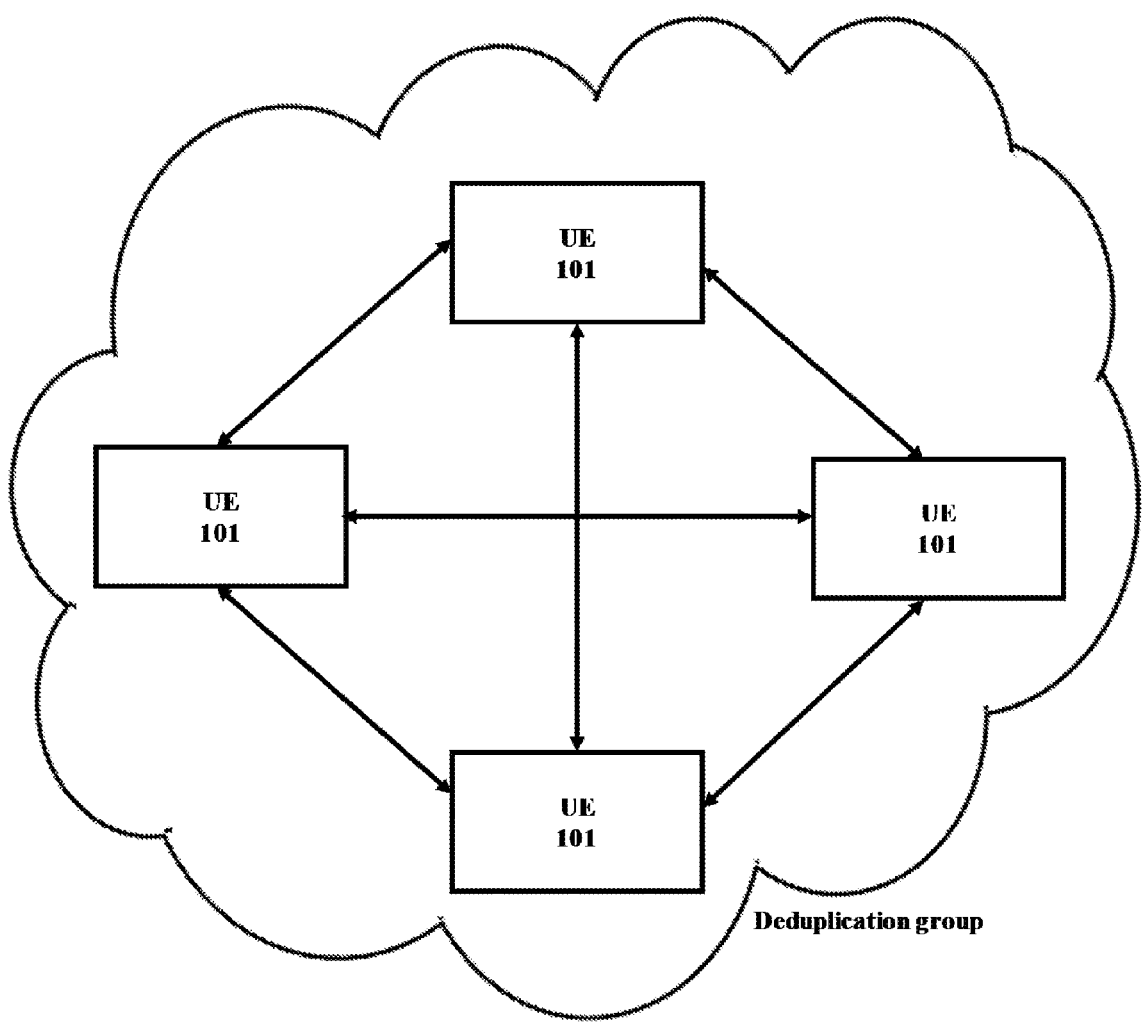
FIGS. 5A and 5B illustrate example diagrams of deduplication groups, as disclosed in the embodiments herein.
Figure 5B:
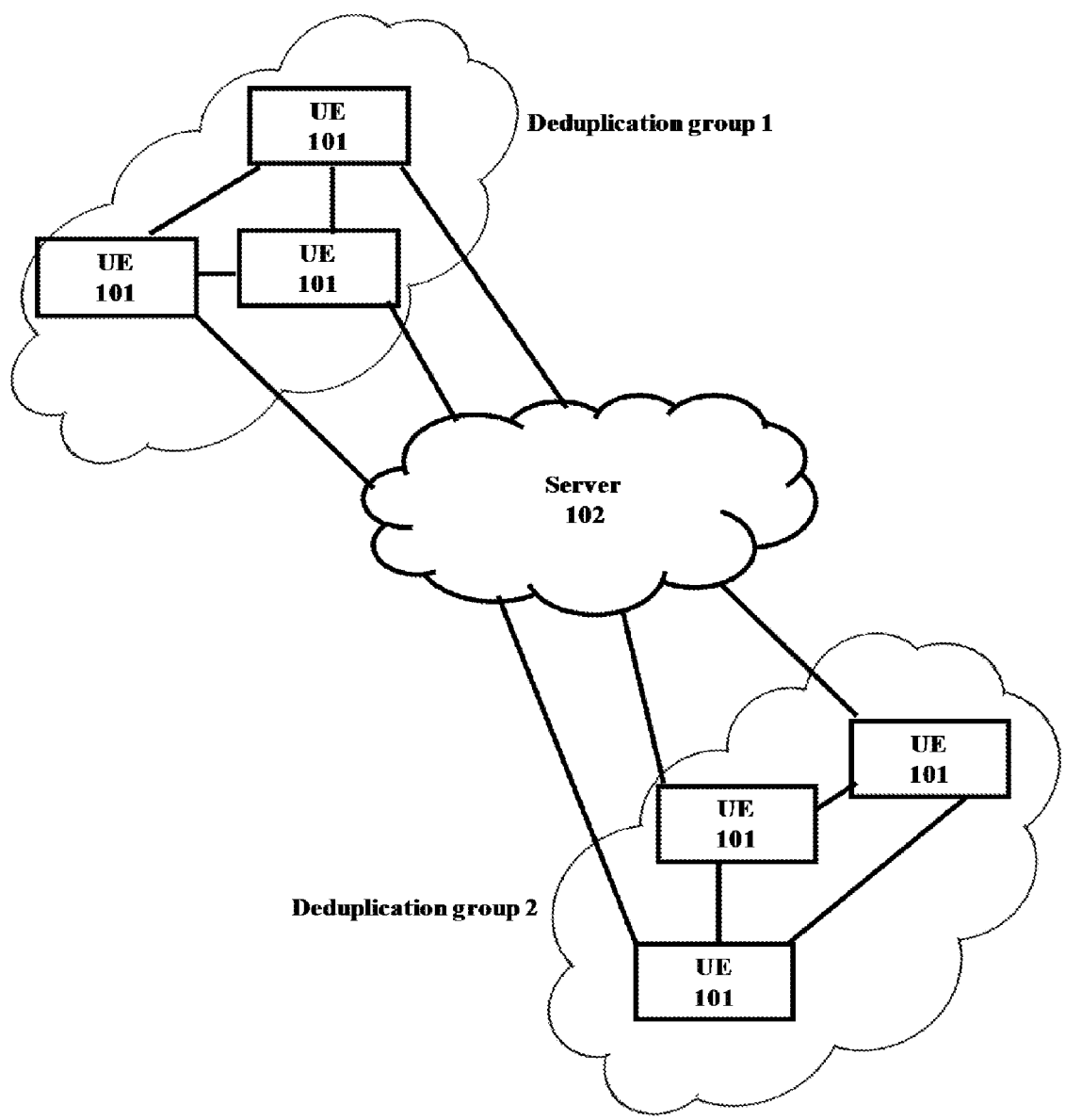

FIGS. 5A and 5B illustrate example diagrams of deduplication groups, as disclosed in the embodiments herein. In a peer-peer design/architecture, selected UEs 101 may be grouped to form a deduplication group. Each UE 101 can communicate with each other UE 101 present in the group. Further, the group may be assigned specific deduplication and encryption parameters such as encryption method, encryption key, signature computation method, block computation method and so on. Further, the UEs 101 present in that particular group may use the assigned parameters while performing deduplication and encryption of data. Further, at least one UE 101 present in the group may possess a storage medium for storing the data. This architecture is depicted in FIG. 5A.

In a client-server architecture, at least one UE 101 may be communicating with the server 102, together forming communication/storage medium. In a preferred embodiment, the server 102 may be able to group connected UEs 101 to different deduplication groups, based on certain parameters such as rate of data exchange, frequency of data exchange, social closeness, work closeness, similarity of data and interests and so on, between those UEs 101. This scenario is depicted in FIG. 5B. In this architecture, the server 102 has divided the UEs 101 to two groups namely deduplication group 1 and Deduplication group 2. Further, same or separate deduplication and encryption parameters may be assigned to group 1 and group 2.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiment disclosed herein specifies a system for global deduplication. The mechanism allows grouping user equipments (UE) and assigning specific deduplication and encryption parameters to groups, providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the application may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method for performing deduplication and encryption on data, said method comprising:
grouping at least a plurality of user equipment to at least one deduplication group by a controller module;
assigning deduplication parameters to the at least one group by said controller module;
assigning at least one encryption method and one encryption key to each of said user equipment by said controller module, wherein the at least one encryption method assigned to each of said user equipment is configured to be at least one of unique for each group and unique for certain groups in a network, wherein the encryption key assigned to each of said user equipment is at least one of a user key, a group key, a group key of said at least one group, and a combination of at least said user key, said group key, and said group key of said at least one group;
creating at least a block of data from said data to be deduplicated and encrypted;
computing at least unique signatures of said block of data by using at least an output of a signature computation function, wherein said output is used to verify at least authenticity of said block of data;
deduplicating at least said block of data by a deduplication and encryption module, wherein said deduplication parameters assigned to each of the at least one group are configured to be either one of different and the same;
performing deduplication on said block of data by using at least rolling checksum based block computation; and
encrypting said deduplicated data by said deduplication and encryption module, wherein said at least one encryption method and encryption key assigned to each of said user equipment are chosen based on the deduplication parameters of at least one of said at least one group.

2. The method as in claim 1, wherein said controller module and said deduplication and encryption module comprise at least one of a server and said user equipment.

3. The method as in claim 1, wherein said grouping of user equipment to said deduplication group is done statically by said deduplication and encryption module.

4. The method as in claim 1, wherein said grouping of user equipment to said deduplication groups is done dynamically by said deduplication and encryption module.

5. The method as in claim 1, wherein said deduplication of said block comprises of deduplicating various sized blocks.

6. The method as in claim 1, wherein said deduplication of said data block further comprises:
   fetching a signature of said data block by said deduplication and encryption module;
   comparing said signature with a database of signatures by said deduplication and encryption module; and
   adding at least one of a reference and said data to said database of signatures based on said comparison by said deduplication and encryption module.

7. The method as in claim 6, wherein said reference is added to said database of signatures on said signature being present in said database of signatures by said deduplication and encryption module.

8. The method as in claim 6, wherein said data is added to said database of signatures on said signature being absent in said database of signatures by said deduplication and encryption module.

9. The method as in claim 1, wherein said encrypting further comprises:
   identifying at least one of said at least one encryption method assigned to said user equipment by said deduplication and encryption module; and
   encrypting said block of data using said identified encryption method key by said deduplication and encryption module.

10. The method as in claim 9, wherein said block of data is encrypted using at least one of an encryption key or a combination of plurality of encryption keys.

11. The method as in claim 1, wherein said grouping of user equipment and said assignment of deduplication parameters are based on at least obtained parameters, and wherein said obtained parameters are obtained by monitoring at least one of:
   a flow of data and a frequency of data between said user equipment;
   input from a user; and
   referring to a group directory system.

12. A system for performing deduplication and encryption on a data, said system comprising:
   a hardware processor; and
   a memory for storing computer executable instructions that when executed by the hardware processor, cause the hardware processor to perform at least:
   grouping at least a plurality of user equipment to at least one deduplication group by a controller module;
   assigning deduplication parameters to the at least one group by said controller module;
   assigning at least one encryption method and one encryption key to each of said user equipment by said controller module, wherein the at least one encryption method assigned to each of said user equipment is configured to be at least one of unique for each group and unique for certain groups in a network, wherein the encryption key assigned to each of said user equipment is at least one of a user key, a group key, a group key of said at least one group, and a combination of at least said user key, said group key, and said group key of said at least one group;
   creating, by said processor, at least a block of data from said data to be deduplicated and encrypted;
   computing, by said processor at least unique signatures of said block of data by using at least an output of a signature computation function, wherein said output is used to verify at least authenticity of said block of data;
   deduplicating at least said block of data by a deduplication and encryption module, wherein said deduplication parameters assigned to each of the at least one group are configured to be either one of different and the same;
   performing deduplication on said block of data by using at least rolling checksum based block computation; and
   encrypting said deduplicated data by said deduplication and encryption module, wherein said at least one encryption method and encryption key assigned to each of said user equipment are chosen based on the deduplication parameters of at least one of said at least one group.

13. The system as in claim 12, wherein said system is further configured to deduplicate various sized blocks.

14. The system as in claim 12, wherein said system is further configured to deduplicate said data block by:
   fetching a signature of said data block using said deduplication and encryption module;
   comparing said signature with a database of signatures using said deduplication and encryption module; and
   adding at least one of a reference and said data to said database of signatures based on said comparison using deduplication and encryption module.

15. The system as in claim 14, wherein said deduplication and encryption module is configured to add said reference to said database of signature on said signature being present in said database of signatures.

16. The system as in claim 14, wherein said deduplication and encryption module is configured to add said data to said database of signatures on said signature being absent in said database of signatures.

17. The system as in claim 12, wherein said system is further configured to encrypt said deduplicated data by:
   identifying at least one of said at least one encryption parameters encryption method assigned to said user equipment, by said deduplication and encryption module; and
   encrypting said data block using said identified encryption parameters encryption method, by said deduplication and encryption module.

18. The system as in claim 17, wherein said system is further configured to encrypt said data block using at least one of an encryption key and a combination of plurality of encryption keys.

* * * * *